Oct. 17, 1950     W. H. BARRETT ET AL     2,526,598
PROCESS FOR PREPARING COATING COLORS
Filed Nov. 2, 1942
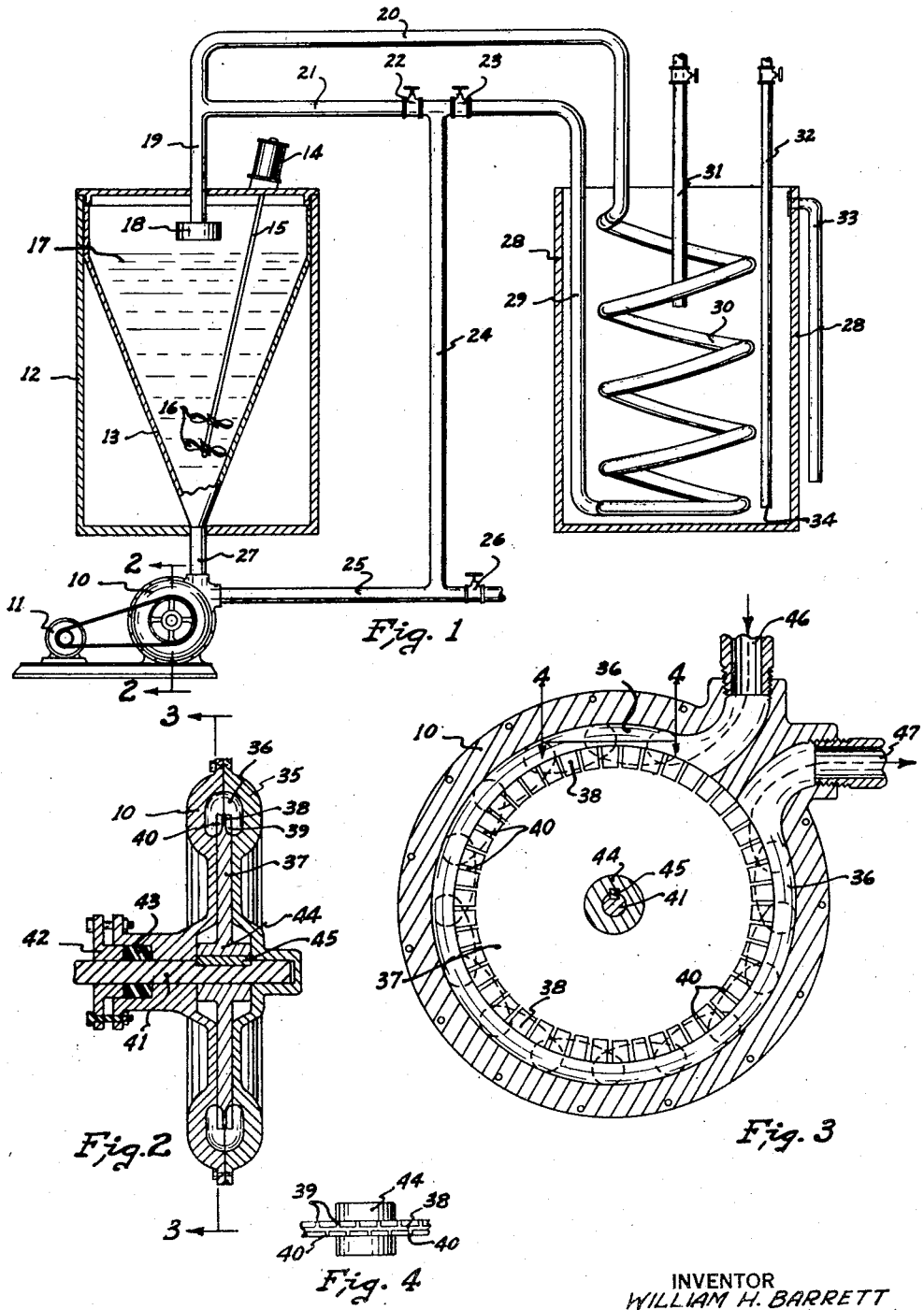
INVENTOR
WILLIAM H. BARRETT
EDGAR ZIMMERMAN
BY H. F. Woodward
ATTORNEY Patented Oct. 17, 1950

2,526,598

UNITED STATES PATENT OFFICE 2,526,598

PROCESS FOR PREPARING COATING COLOR

William H. Barrett and Edgar Zimmerman, International Falls, Minn., assignors to Minnesota and Ontario Paper Company, Minneapolis, Minn.

Application November 2, 1942, Serial No. 464,284

4 Claims. (Cl. 106—137)

This invention relates to a new and improved process of preparing color composition adapted for use as a coating material and suitable for numerous purposes in various industrial processes. This invention also relates to a novel apparatus for preparing the composition.

The composition prepared by the process may be used among other purposes for coating paper. In the manufacture of paper for use in high-grade printing work, it is customary to apply to the web (raw stock) a layer of an aqueous suspension of pigment and adhesive. Paper so treated may be referred to as "mineral coated paper."

A procedure heretofore employed for the preparation of a mineral-coating composition was to mix an adhesive such as starch with cold water in the adhesive cooking tank, the mixture being stirred usually by some form of paddle agitator, while the temperature of the mixture was raised until the adhesive was cooked and dispersed. The pigment or pigments were then added and the stirring continued until the composition was uniformly mixed.

It is recognized in the paper coating industry that when coating compositions are made it is desirable to mix under such conditions that the clay or other pigments, or combination of pigments should be entirely free of agglomerates. The adhesive should be mixed with the pigments under such condition that a homogeneous composition is obtained and that each particle of pigment is entirely surrounded by the adhesive.

These conditions are seldom met in actual practice. A description of a generally used system of color composition preparation will illustrate the point. The adhesive material (casein, alpha protein, starch, etc.) are "cut" in a large steam jacketed tank provided with slow speed paddle agitators for stirring. The clays and other pigments are dispersed with water in a wooden or metal tank equipped with slow speed paddle agitators (these paddles are usually less than 100 R. P. M.). The clays are usually made up to about 60% total solids and the mixing continued until a paste is formed relatively free from aggregates. This requires a minimum time of 2 to 3 hours per batch (2000 pounds of clay per batch) depending somewhat on the particular clay used and dispersing agents added, and even then a product entirely free of agglomerates is not obtained. An analysis of mixing conditions will indicate why such long periods of time are required to accomplish a fair degree of dispersion.

The paddles are slow and the clay slurry quite viscous so that the mixing depends mainly on a shearing of the particles over each other, the rates of shear are too low to give rapid mixing and distintegration of agglomerates. In this type of mixer if the viscosity is too low either because of low solids or because of the presence of dispersing agents agglomerated particles will not be broken up at all because the speed is too slow and shearing forces within the mixture itself are much less than if it were more viscous.

The adhesive is mixed into the pigment slurry in a second mixer similar in action to that just above described and the same principles apply. In all coating preparation systems of this type auxiliary screening and/or filtering equipment are required for the mixed coatings and even with these, small agglomerates of pigment and/or adhesive often appears on the coated paper.

The principal object of the present invention is to simplify and improve the method and apparatus for preparing color compositions.

In the first place, most of the common paper coating compositions containing clays and adhesives such as starch, casein, alpha protein, maizine (zein), etc. are thixotropic to a greater or less degree. That is, as the rate of flow or agitation increases the apparent viscosity becomes less. The high speed pump which is an essential part of the coating preparation system is able to handle this type of liquid very efficiently because it keeps the liquid at minimum viscosity during the mixing while at the same time very high shearing and centrifugal forces are exerted. The apparent viscosity at mixing speed is one of the most important single factors in coating mixing. High speed mixing also makes it possible to handle mixtures of higher solids content than could be handled by low speed mixers. Numerous examinations of the coating compositions prepared by the new apparatus have shown that they are entirely free of any agglomerates of pigment or adhesive.

The combination of the high speed pump with a rapid heat transfer unit, the process normally requiring three separate units is now replaced with one, and dispersion of pigment, cooking of adhesive is carried out at the same time, in addition to obtaining a superior final product.

The impeller of the pump which develops the intensive agitation is always completely submerged in the liquid, the mixing is done under conditions which produce a minimum of foam. It is highly important for all coating compositions that foaming be kept at a minimum.

These and other objects not specifically enumerated are contemplated for this invention as will readily appear to one skilled in the art, as the following proceeds.

Other objects and advantages of the present invention will be apparent from the accompanying drawings and the following detailed description.

In the drawing:

Figure 1 is vertical section through the apparatus for preparing the color composition;

Figure 2 is a section through the pump taken on line 2—2 of Figure 1;

Figure 3 is a sectional view through the pump taken on line 3—3 of Figure 2; and Figure 4 is a view of the impeller taken on line 4—4 of Figure 3.

The numeral 12 indicates a tank or vessel which may or may not be provided with a cover member. The vessel 12 may be made in various shapes but to facilitate the movement of the material from the vessel to the dispersion apparatus 10 it is preferred that the lower portion 13 be funnel-shaped.

To prevent channeling of the material 17 in the vessel 12 a high-speed stirrer is used. The high speed stirrer consists of a shaft 15 upon which is mounted a plurality of impellers 16 and means for driving the shaft such as motor 14 is provided.

The material to be dispersed and/or cooked is placed in the vessel 12. The material passes from the vessel 12 to the dispersing apparatus 10 by a suitable conduit 27. From the dispersing apparatus the material passes through conduits 25, 24 and 29 to the heat exchanger coil 30. From the heat exchanger the material is returned to the vessel 12 by conduit 20 and 19 and discharge head 18. Upon the completion of the treatment the finished material is discharged from the apparatus by opening valve 26 which permits the colloidal suspension to be conducted to suitable storage or to the place where it is to be employed.

The heat exchanger as shown in Figure 1 consists of a vessel or container 28 which is provided with overflow means 33.

In the vessel 28 is positioned a coil of relatively small diameter. The heat exchanger must be of such construction that the material will pass therethrough relatively fast in finely divided stream or streams. The vessel 28 is filled with water and steam for heating is supplied through conduit 32 and discharged at 34 near the bottom of the vessel. When it is desired to reduce the temperature of the color composition the supply of steam is discontinued and a cooling medium such as water is supplied to the vessel 28 through pipe 31. The temperature of the circulating material can be controlled by by-passing the heat exchanger with part of the material. This can be accomplished by regulating valves 22 and 23. The material that does pass to the heat exchanger passes by the way of pipe 21 back to the vessel 12.

The dispersion apparatus includes a casing 35 which as shown in Figure 2 consists of two sections. The casing has a channel 36 extending therearound and in this casing the edge of the impeller 37 runs. The impeller edge which runs in the channel 36 has pockets which are defined by walls 38, 39 and 40. The circular impeller 37 has a hub 44 through which passes shaft 41. The shaft is driven by a suitable means such as an electrical motor 11 which may be mounted directly upon shaft 41 or arranged as shown in Figure 1. The peripheral speed of the impeller must be relatively fast, for example 3000 feet per minute to 6000 feet per minute. A speed of about 3500 to about 3600 has given excellent results and the path which the material is believed to follow is shown in broken lines on Figure 3.

By way of example a starch or other water adhesive color composition, pigment and water are supplied to container 12. The vessel 28 is filled with water and steam admitted to the container 28 through supply conduit 32 and being discharged at 34 near the bottom of the vessel. The dispersion apparatus is now ready to be started.

The material is subject to very high shearing and centrifugal forces and the viscosity is kept at a minimum. The impeller 37 when developing the intensive agitation is submerged in the material and little or no foam is developed. Very high solid contents may be prepared by the new apparatus and process in fact a solid content of up to about 75% has successfully been prepared.

Coating compositions employing starch may be prepared in many ways in the new apparatus, of which the following are three:

1. Cooked starch is added to a slurry of clay or a combination of clay and other pigments. This mixture is then passed through the apparatus to give an intimate dispersion.

2. Dry clay or other pigment may be added to a cooked starch solution and this mixture given an intimate mixing in the dispersion apparatus.

3. Raw starch and clay and/or other pigment may be mixed together in all the water and the dispersion and cooking done at the same time.

An example of a formula giving 65% total solids:

| | Kilograms |
|---|---|
| Water | 5.250 |
| Oxidized starch | 1.620 |
| Coating clay | 8.130 |
| Terra-sodium-pyrophosphate | [1] .032 |

[1] Wetting agent.

High strength pigments such as titanium dioxide, zinc sulphide lithopone, etc. are often added to clay coating compositions to give increased hiding power and brightness. The maximum efficiency from these pigments is obtained when they are thoroughly dispersed with clay. Since, in comparison to clay, these pigments are very expensive it is essential to obtain the maximum possible hiding power per unit of weight. The new apparatus does a very efficient job of dispersion with these pigments as shown by the following:

Formula

Pigment:
 90% HT clay
 10% titanium dioxide
Adhesive, 20% starch (on weight of pigment)
Water to make 65% total solids

Methods

A. Starch cooked in all of the water, dry pigment added and stirred in with a high speed mixer.

B. A, above passed through dispersion apparatus for 10 minutes.

C. Formula cooked and dispersed at same time about 160° F. to about 180° F. for 10 minutes.

Samples of the coating prepared by each method were measured for hiding power in the Pfund Cryptometer, with the following results:

|  | Method of Dispersion | | |
| --- | --- | --- | --- |
|  | A | B | C |
| Hiding Power in sq. ft./gal | 258 | 290 | 352 |
| Per cent increase in hiding power |  | 12.4 | 36.4 |

The new apparatus is especially well suited for enzyme conversion of starches. In this process intensive agitation and rapid heat transfer are essential for best results. It is preferred that the conversion be made in presence of pigments and other materials of the coating composition.

Conversion in the presence of pigments (65% total solids)

|  | Kilograms |
| --- | --- |
| Water | 5.250 |
| Pearl starch | 1.270 |
| Alpha protein [1] | 0.065 |
| Soda ash | 0.008 |
| Enzyme (vanzyme) | 0.026 |
| Coating clay | 8.480 |

[1] Purpose of protein is to satisfy protein demand of clay so less enzyme will be required.

This mixture is heated to 150° and held for 10 minutes. Then to 170° F. for 20 minutes (or longer if necessary) then to 200° F. for 10 minutes and then cooled to working temperature.

The time required for preparing the colloidal suspension is greatly reduced over any known process and the quality of the coating in hiding power and other characteristics is far superior to prior compositions.

While the process and apparatus herein described constitutes preferred embodiments of the invention, it is to be understood that the invention is not limited to this precise process and apparatus and that changes may be made therein without departing from the scope of the invention which is defined in the appended claims.

What we claim:

1. A process of preparing mineral coating composition comprising, introducing into a container a selected quantity of starch, protein, pigment and water; continuously withdrawing the material from the container; applying high shearing and centrifugal force to the mixed material at the same time while the material is passing through a restricted passage, and then heating the moving material to a cooking temperature.

2. A process of preparing an aqueous paper coating composition comprising, mixing a selected quantity of starch, pigment, and water, continuously flowing the mixture through a restricted passage and simultaneously applying high shearing and centrifugal force to material in the passage and then applying cooking temperature to the material.

3. A process of preparing a paper coating composition of high solids content comprising, mixing a selected quantity of water phased adhesive, pigment, and water; continuously passing the mixed material through a channel and first simultaneously applying high shearing and centrifugal force to the material and then applying a cooking temperature of about 160° to about 180° F.

4. A cyclic process of preparing mineral coating composition comprising; introducing into a container a selected quantity of water, starch, protein, and pigment; continuously withdrawing the materials from the container to a dispersion apparatus; applying high shearing and centrifugal forces to the material while circulating the material; heating the material in fast moving small stream, returning the material to the container and continuously circulating for a time with part of the circulation being carried out without the application of heat.

WILLIAM H. BARRETT.
EDGAR ZIMMERMAN.

REFERENCES CITED

The following references are of record in the file of this patent:

UNITED STATES PATENTS

| Number | Name | Date |
| --- | --- | --- |
| 1,317,966 | Deemer et al. | Oct. 7, 1919 |
| 1,447,898 | Schlosstein | Mar. 6, 1923 |
| 1,577,052 | Auspitzer | Mar. 16, 1926 |
| 1,671,868 | McGougan et al. | May 29, 1928 |
| 1,958,118 | Szegvari | May 8, 1934 |
| 2,021,143 | Calcott et al. | Nov. 19, 1935 |
| 2,185,110 | Coleman | Dec. 26, 1939 |
| 2,351,683 | Hughes et al. | June 20, 1944 |
| 2,360,828 | Craig | Oct. 24, 1944 |
| 2,364,744 | Lindsey | Feb. 20, 1945 |

OTHER REFERENCES

Paint Manufacture, June 1935. Article on Paint Making Machinery by N. N. Maas, pages 202-207.